United States Patent
Zhang et al.

(10) Patent No.: US 11,667,826 B2
(45) Date of Patent: Jun. 6, 2023

(54) HIGH DENSITY BRINE WITH LOW CRYSTALLIZATION TEMPERATURE

(71) Applicant: Schlumberger Technology Corporation, Sugar Land, TX (US)

(72) Inventors: Hui Joyce Zhang, Sugar Land, TX (US); Xia Wei, Houston, TX (US); Steven Young, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/450,900

(22) Filed: Oct. 14, 2021

(65) Prior Publication Data

US 2022/0213374 A1 Jul. 7, 2022

Related U.S. Application Data

(62) Division of application No. 15/276,153, filed on Sep. 26, 2016, now Pat. No. 11,149,180.

(60) Provisional application No. 62/235,176, filed on Sep. 30, 2015.

(51) Int. Cl.
| | |
|---|---|
| C09K 8/05 | (2006.01) |
| C09K 8/516 | (2006.01) |
| E21B 33/13 | (2006.01) |
| C09K 8/504 | (2006.01) |
| C09K 8/03 | (2006.01) |
| C09K 8/42 | (2006.01) |
| C09K 8/57 | (2006.01) |
| E21B 21/00 | (2006.01) |

(52) U.S. Cl.
CPC ............... *C09K 8/05* (2013.01); *C09K 8/032* (2013.01); *C09K 8/426* (2013.01); *C09K 8/5045* (2013.01); *C09K 8/516* (2013.01); *C09K 8/572* (2013.01); *E21B 21/003* (2013.01); *E21B 33/13* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,465,061 A | 8/1984 | McMurtrie | |
| 4,566,976 A | 1/1986 | House et al. | |
| 4,792,412 A | 12/1988 | Heilweil | |
| 4,825,950 A | 5/1989 | Kalpakci et al. | |
| 7,892,352 B2 | 2/2011 | Roddy et al. | |
| 8,822,386 B2 | 9/2014 | Quintero | |
| 9,040,466 B2 | 5/2015 | Deville | |
| 2006/0096757 A1 | 5/2006 | Berry et al. | |
| 2006/0127301 A1 | 6/2006 | Elitzur et al. | |
| 2006/0151171 A1 | 7/2006 | Davies | |
| 2008/0078545 A1 | 4/2008 | Welton et al. | |
| 2011/0177986 A1 | 2/2011 | Walker | |
| 2011/0162845 A1 | 3/2011 | Ravi | |
| 2012/0211227 A1 | 4/2012 | Roddy | |
| 2014/0144633 A1 | 5/2014 | Nguyen | |
| 2014/0158354 A1 | 6/2014 | Kumar et al. | |
| 2016/0017204 A1* | 1/2016 | Hill | C09K 8/74 166/305.1 |
| 2017/0088762 A1 | 3/2017 | Zhang | |

FOREIGN PATENT DOCUMENTS

| | | | | |
|---|---|---|---|---|
| RU | 2659046 C1 * | 6/2018 | ............. | C04B 28/24 |
| WO | 2014085770 A1 | 6/2014 | | |
| WO | 2016196332 A1 | 12/2016 | | |
| WO | WO-2016196332 A1 * | 12/2016 | ............... | C09K 8/04 |

OTHER PUBLICATIONS

Examination Report dated May 11, 2018, issued in British Application No. GB1616584.7.
Cabot "Formate Technical Manual" Section A5, Crystallization Temperature, pp. 1-20, Jun. 2015.
Search and Examination Report issued in British Application No. 881616584.7 dated Mar. 14, 2017.
Communication pursuant to Article 94(3) for the European patent application 16804144.0, dated Oct. 17, 2019.
International Search Report and Written Opinion issued in International patent application PCT/US2016/34758, dated Aug. 24, 2016.
International Preliminary Report on Patentability issued in International patent application PCT/US2016/34758, dated May 16, 2017.
Extended Search Report issued in European patent application 16804144.0, dated Nov. 22, 2018.
Halvey, et al., "The geological history of seawater", Science, 2017, 355, pp. 1069-1071.
Office Action issued in U.S. Appl. No. 18/045,999 dated Feb. 16, 2023, 9 pages.
Office Action issued in Mexican Patent Application No. MX/a/2017/015414 dated Oct. 14, 2022, 14 pages with English translation.
Testing of Heavy Brines, API Recommended Best Practice 13J, Sixth Edition, Jan. 2023, 91 pages.

* cited by examiner

*Primary Examiner* — Charles R Nold
(74) *Attorney, Agent, or Firm* — Jeffrey D. Frantz

(57) ABSTRACT

A wellbore fluid comprising a first aqueous base fluid and a plurality of silica nanoparticles suspended in the first aqueous base fluid. The nanoparticles are present in the fluid in an amount to have an effect of decreasing a crystallization temperature by at least 4 to 55° F. as compared to a second aqueous base fluid without the silica nanoparticles.

12 Claims, No Drawings

HIGH DENSITY BRINE WITH LOW CRYSTALLIZATION TEMPERATURE

CROSS-REFERENCE TO RELATED APPLICATIONS

This application is a Division of U.S. patent application Ser. No. 15/276,153, filed on Sep. 26, 2016, which claims priority to U.S. Patent Application No. 62/235,176, filed on Sep. 30, 2015, the contents of which are incorporated by reference.

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Once drilling operations have been completed, the well is prepared for the completion operations whereby the mud used for drilling is often displaced by a completion fluid. There are numerous methods of completing a well, amongst which are open-hole completions, pre-drilled, liner, and gravel packed screened systems. Completion fluids broadly refer to any fluid pumped down a well after drilling operations have been completed, including fluids introduced during acidizing, perforating, fracturing, workover operations, etc. A drill-in fluid is a specific type of drilling fluid that is designed to drill and complete the reservoir section of a well in an open hole, i.e., the "producing" part of the formation. In particular, it is desirable to protect the formation from damage and fluid loss, and not impede future production. Most drill-in fluids contain several solid materials including viscosifiers, drill solids, and additives used as bridging agents to prevent lost circulation and a barite weighting material to control pressure formation.

Upon completion of drilling, a filter cake and/or fluid loss pill may stabilize the wellbore during subsequent completion operations such as placement of a gravel pack in the wellbore. Additionally, during completion operations, when fluid loss is suspected, a fluid loss pill of natural polymers and/or bridging agents may be spotted to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

SUMMARY

In one aspect, embodiments are directed to a wellbore fluid that includes a first aqueous base fluid; and a plurality of silica nanoparticles suspended in the first aqueous base fluid, wherein the nanoparticles are present in the fluid in an amount to have an effect of decreasing a crystallization temperature by at least 4 to 55° F. as compared to a second aqueous base fluid without the silica nanoparticles.

In another aspect, embodiments are directed to a method for completing a wellbore that includes pumping a wellbore fluid into the wellbore, the wellbore fluid comprising: a first aqueous base fluid; and a plurality of silica nanoparticles suspended in the first aqueous base fluid, wherein the nanoparticles are present in the fluid in an amount to have an effect of decreasing a crystallization temperature by at least 4 to 55° F. as compared to a second aqueous base fluid without the silica nanoparticles; and performing at least one completion operation while the wellbore fluid is in the wellbore.

DETAILED DESCRIPTION

Generally, embodiments disclosed herein relate to methods of lowering crystallization temperature(s) of completion fluids/brines using nanosilica particles. More specifically, embodiments disclosed herein relate to wellbore fluids for downhole applications formed of an aqueous base fluid and a plurality of nanoparticles suspended in the aqueous base fluid, wherein the nanoparticles are present in the aqueous base fluid in an amount effective to have an effect of decreasing the crystallization temperature of the aqueous base fluid as compared to a second aqueous base fluid without the silica nanoparticles. The inventors of the present disclosure have found that nanoparticles of specific size and in sufficient quantity suspended in an aqueous base fluid may be used for the preparation of wellbore fluids that exhibit a low true crystallization temperature (TCT) or a pressurized crystallization temperature (PCT) of the brine.

The wellbore fluids of the present disclosure incorporate a plurality of nanoparticles that can be dispersed or suspended in a base fluid. As defined herein, nanoparticles are defined as having at least one dimension of less than 1 micron. The nanoparticles act as brine crystallization temperature agents reducing the TCT by at least 5° F. In embodiments, nanoparticles within a first aqueous base fluid herein may decrease a crystallization temperature (e.g., TCT, PCT) by at least 4 to 55° F. as compared to a second aqueous base fluid without the nanoparticles. Thus, the nanoparticles may be present in the wellbore fluid in an amount that ranges from about 1 wt % to 35 wt % of the total weight of the wellbore fluid, where the lower limit can be any of about 1 wt %, 5 wt %, 10 wt %, 15 wt %, or 20 wt % and the upper limit can be any of about 25 wt %, 30 wt %, 35 wt %, where any lower limit can be used with any upper limit.

Due to their small size, nanoparticles do not damage or plug the producing formation and thus may be present in the production interval during completion operations. The wellbore fluids incorporating the nanoparticles of the present disclosure are stable and meet the desired rheology and filtration properties for application in completion operations such as completion brines, fluid loss pills, reservoir drill in fluids, or as gravel packing fluids.

As described herein, the term completion fluid refers to fluids present in the wellbore and/or used during a wellbore operation to complete a well. A completion brine is a high density fluid which is substantially free of solids and may be used as a completion fluid in the wellbore or may be used as a base to which other additives may be added for specific completion purposes (such as gravel packing, fluid loss pills or drilling fluids). While a completion brine is conventionally solids free, the present fluid may still be used, because of the small size of the nanoparticles incorporated therein.

Their presence may be tolerated in certain proportions while still imparting an improvement in lowering the crystallization temperature of the wellbore fluid.

In addition to reducing crystallization temperature of a base fluid as noted above, nanoparticles used for the formulation of wellbore fluids of the present disclosure may exhibit the following properties: a) do not or minimally interact with the base fluid and other components of the wellbore fluid; b) form a stable dispersion; and c) do not settle. The nanoparticles that have shown utility in the wellbore fluids of this disclosure are silica nanoparticles which may be suspended or dispersed in an aqueous base fluid.

In one or more embodiments, the nanoparticles may be coated or uncoated. As used herein, the term coated refers to any chemical or physical modification applied to the surface of the nanoparticles with the purpose of improving the dispersibility and/or the suspendability of the nanoparticles, as well as to modify their physical and/or chemical properties. As noted above, the addition of nanoparticles to a wellbore fluid may result in a high density wellbore fluid.

The silica nanoparticles that have shown utility in the wellbore fluids of this disclosure are colloidal silica. According to the present embodiments, the amount of pure silica contained in the colloidal silica products may range from about 1 wt % to 35 wt %, where the lower limit can be any of about 1 wt %, 5 wt %, 15 wt %, or 20 wt % and the upper limit can be any of about 25 wt %, 30 wt %, 35 wt % where any lower limit can be used with any upper limit. One example of such a solution is available commercially from NYACOL NANO TECHNOLOGIES (Ashland, Mass.) under the name of DP9717. DP9717 contains pure $SiO_2$ in water mixed with a small amount of sodium ions ranging from about 100 to about 400 ppm. The sodium ions bond to the silica matrix and do not diffuse out to a certain degree. Such a silica product is stable in a pH range from 2.5 to 10.5. In various embodiments, the silica nanoparticles may be provided as a solution of nano-sized precipitated silica which is formed from a controlled neutralization of sodium silicate with the formation of a nano-sized solid material that can be concentrated in the solution. Such solid suspensions, depending on the method of manufacture, can be closer to neutral pH, and can be engineered to be very stable in high hardness solutions.

The aqueous base fluid of the present disclosure may generally be any water based fluid phase. In one or more embodiments, the aqueous base fluid forms the continuous phase of the fluid and may be selected from: fresh water, sea water, brines, mixtures of water or brine and water soluble organic compounds and mixtures thereof. In those embodiments of the disclosure where the aqueous medium is a brine, the brine is water comprising an inorganic salt or organic salt. The salt may serve to provide a portion of the fluid's density (to balance against the formation pressures), and may also reduce the effect of the water based fluid on hydratable clays and shales encountered during completion. In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, nitrates, oxides, sulfates, silicates, phosphates and fluorides. Salts that may be incorporated in a brine include any one or more of those present in natural seawater or any other organic or inorganic dissolved salts. The brines that have shown utility in the wellbore fluids of this disclosure may include halide brines, and sodium and potassium formate brines. According to embodiments of the present disclosure, the halide brines may be selected from the group of alkali metal halides and/or and alkaline earth metal halides. Thus, in one or more embodiments, the wellbore fluid is zinc free for environmental benefit and cesium free for cost benefit. In one or more embodiments, the halide brines are calcium chloride or calcium bromide. Sodium bromide, sodium chloride, potassium chloride, or potassium bromide may also be used. According to the present embodiments, brines (to which the nanoparticles are added) may be formulated with a salt density typically in a range from about 8.5 to about 15.1 lb/gal depending on the particular use and specific conditions.

A first characteristic of a wellbore fluid is the density of the fluid. Moreover, as the brine may contain one or more salts dissolved in a base fluid, the crystallization temperature of the brine is another parameter to be considered. For example, it is well known that the use of brines for low temperature applications in cold climates and/or deep wells presents a problem of brine crystallization. At temperatures at or below the crystallization temperature of the brine, the precipitation of crystallizing solids (e.g., salts) can change the density of the brine fluid through the wellbore column and as a result, deteriorate the ability of the fluid to maintain pressure control. Further crystallization may also lead to crystallized solids plugging the subterranean well. For example, $CaBr_2$ is a brine useful to formulate wellbore fluids with a density ranging up to 15.3 lb/gal, but from 14.5 lb/gal to above, its true crystallization temperature (TCT) and the PCT (crystallization under pressure) are too high for deep water applications.

The crystallization temperature of a brine is commonly measured in accordance to a standardized test method described in ANSI/APS Recommended Practice 13J. To characterize the crystallization profile of the brine, as described in API Recommended Practice 13J, an apparatus is used to alternately cool and heat a sample of brine fluid for measuring three different crystallization temperatures. During testing, the sample is slowly and continuously cooled until a temperature is reached at which visible crystals start to form in the sample and the temperature is recorded as the First Crystal to Appear (FCTA) temperature. During cooling, the FCTA temperature corresponds to a minimum inflection point in a plot of temperature versus time, the minimum inflection point being generally the result of a super-cooling effect. Upon reaching the FCTA temperature, the cooling temperature is held constant while the exothermic brine crystallization process proceeds. Heat is released during the brine crystallization process and the maximum temperature, or maximum inflection point, reached immediately following the FCTA temperature is recorded as the True Crystallization Temperature (TCT). The TCT corresponds to the actual true crystallization temperature of the brine. In one or more embodiments of the disclosure, the silica nanoparticles may reduce the TCT of the brine by 5° to 35° F.

Upon mixing, the fluids of the present embodiments may be used in wellbore operations, such as base brines in drilling fluids, completion, fluid loss treatment or gravel packing operations. Such operations are known to persons skilled in the art and involve pumping a wellbore fluid into a wellbore through an earthen formation and performing at least one wellbore operation while the wellbore fluid is in the wellbore.

One embodiment of the present disclosure involves a method for completing a wellbore. In one such an illustrative embodiment, the method involves pumping an aqueous wellbore fluid into a wellbore and performing at least one completion operation while the wellbore fluid is in the wellbore. Such a wellbore fluid includes an aqueous base fluid and a plurality of silica nanoparticles suspended in the aqueous base fluid. In an embodiment of the present disclosure, the wellbore fluid is prepared by mixing a plurality of colloidal silica nanoparticles with a brine at a pH ranging from about 2 to 10, with the formation of a premix fluid. In yet other embodiments, the lower limit of the pH may be any of 2.5, 3 or 3.5, and the upper limit can be any of, 8, 8.5, or 9, where any lower limit can be used with any upper limit. The premix fluid may be heated to form the wellbore fluid with a desired density. In another embodiment of the present disclosure, instead of heating, the premix fluid may be mixed with dry salts with the formation of the wellbore fluid with a desired density. In various embodiments, the dry salts may be the same as the halides used for the preparation of the brine. In one or more embodiments, other salts may be used.

In one or more embodiments, the fluids formulated according to this disclosure may be used as fluid loss pills when fluid loss to the formation is experienced during a completion operation. In one embodiment, the fluid loss pill may be prepared using high density base brines as described herein. The brine may be pre-saturated with a selected salt or mineral particulates thereby rendering any further salt or particulates as substantially insoluble in the pre-saturated base brine. In yet another embodiment, when the wellbore fluid is a fluid loss pill, the fluid may further include a gelling agent which can be added to the formulation in a concentration as rheologically and functionally determined by wellbore conditions. Suitable gelling agents or vicosifiers further include various organic and/or inorganic polymeric species including polymer viscosifiers, especially metal-crosslinked polymers. Suitable polymers for making the metal-crosslinked polymer viscosifiers include, for example, polysaccharides e.g., substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents which include boron, titanium, zirconium and/or aluminum complexes are used to increase the effective molecular weight of the polymer and make them better suited for use as viscosity increasing agents, especially in high-temperature wells.

Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In embodiments disclosed herein, cellulose derivatives are used, including hydroxyethylcellulose (HEC), hydroxypropylcellulose (HPC), carboxymethylhydroxyethylcellulose (CMHEC), and/or carboxymethycellulose (CMC), with or without crosslinkers. Xanthan, diutan, and scleroglucan are also used.

In addition to cross-linked polymers, linear polymer systems may be used. Boron crosslinked polymers systems may be used including guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium cross-linked polymer systems include polymers crosslinked with zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid.

To prevent fluid loss during well treatment, solid bridging materials may be used. Bridging materials may be insoluble, sparingly soluble, or slowly soluble in the well-bore fluid. Bridging materials may also have a particular shape and hardness such that they may be malleable, and/or round to non-spherical. Bridging materials may include various organic and inorganic salts, oxides, and the like in various insoluble physical forms, whether crystalline or amorphous, including powder, granules, beads, paste, fibers, and/or the like. These fluid loss additives are subsequently incorporated as filter cake components upon dehydration of the fluid loss pill when a differential pressure is applied on a porous medium. The bridging solid particles of the present disclosure may include inorganic compounds, such as salts and/or oxides. In one or more embodiments, the bridging solids may be carbonates such as calcium carbonates, barium carbonates, and the like.

The bridging solid particles may have an average size of about 0.5 to about 5,000 micrometers (μm) as determined according to methods known in the art. Within this range, the average size of the bridging solid particles may be greater than or equal to about 1 μm, greater than or equal to about 10 μm, or greater than or equal to about 100 μm. Also within this range, the average size of the bridging solid particles may be less than or equal to about 2,000 μm, less than or equal to about 1,000 μm, or less than or equal to about 500 μm. The bridging solid particles may be present within the fluid loss pill at about 1 wt %, to about 90 wt %, based on the total weight of the fluid loss pill. Within this range, the concentration of the bridging solid particles may be greater than or equal to about 10 wt %, greater than or equal to about 20 wt %, or greater than or equal to about 30 wt %. Also within this range, the concentration of the bridging solid particles may be less than or equal to about 80 wt %, less than or equal to about 70 wt %, or less than or equal to about 60 wt %.

The following examples are presented to further illustrate the preparation and properties of the wellbore fluids of the present disclosure and should not be construed to limit the scope of the disclosure, unless otherwise expressly indicated in the appended claims.

The wellbore fluids of the present disclosure, which are prepared using aqueous base fluids and silica nanoparticles, exhibit stability and wellbore performance, as well as high density and a low TCT.

EXAMPLES

Several wellbore fluid formulations, HD-1 to HD-4, respectively, were prepared using colloidal silica and CaBr$_2$ brine. For example, the HD-1 and HD-5 were prepared by using 14.2 ppg CaBr$_2$, which was weighed up to 14.5 and 15.4 ppg, respectively, by using colloidal silica having a D50 of approximately 80 nm. A series of tests were conducted to evaluate these formulations.

For a basic evaluation, the density of the samples was measured by using a densitometer. The pH was detected by means of a hydrometer, while TCT was measured in accordance with the standardized test method described in API Practice 13J. PCT was measured using a similar method as the one used for TCT, but the measurements were performed under a pressure of 15,000 psi. The solution of 14.2 lb/gal CaBr$_2$ has the TCT around −1° F. and the PCT around 22° F. HD-1 to HD-4 exhibit much lower TCT and PCT values than the CaBr$_2$ brine. This demonstrates that the silica nanoparticles present in the fluid increase the brine density while lowering the brine crystallization temperature.

TABLE 1

Properties of HD-1, HD-2, HD-3, and HD-4 brines

| Property | HD-1 | HD-2 | HD-3 | HD-4 |
| --- | --- | --- | --- | --- |
| Density | 14.5 lbm/gal | 14.7 lbm/gal | 15.0 lbm/gal | 15.4 lbm/gal |
| True Crystalline Temperature | <−10° F. | <0° F. | <5° F. | 30° F. |
| PCT at 15,000 psi | 12 ± 2° F. | 20 ± 2° F. | 26 ± 2° F. | — |
| pH | 5.0-6.0 | 4.5-5.5 | 4.0-5.0 | 2.0-3.0 |
| Viscosity at 40° F. | 16.5 cP | 19 cP | 24 cP | 48 cP |
| Viscosity at 72° F. | 9.5 cP* | 10.5 cP | 16 cP | 33 cP |
| Viscosity at 120° F. | 6.2 cP | 6.4 cP | 8.8 cP | 17.5 cP |

To fully assess the properties of the 4 formulations, the rheology of the resulting wellbore fluids was measured using a Fann 35 Viscometer with modified (0.2×) spring at the rpm indicated. The rheology properties at different temperatures of the 4 samples are presented also in Table 1.

Additional data is provided below to support the finding that when applying nanosilica to high density brines, CaBr$_2$ or CaCl$_2$, or example, low crystallization temperature fluids were achieved that have TCT and/or PCT significantly lower than the same type of brine at equivalent density but without silica.

TABLE 9

TCT and PCT reductions with nanosilica

| Brine type | Density | Wt % of silica | TCT | PCT under 15K psi |
| --- | --- | --- | --- | --- |
| CaBr$_2$ | 14.5 ppg | 0 | 23 F. | 52 F. |
| CaBr2 | 14.5 | 1 | 18 F. | |
| CaBr2 | 14.5 | 2 | 10 F. | 36 F. |
| CaBr2 | 14.5 | 6 | 5 F. | 30 F. |
| CaBr2 | 14.5 | 17 | −18 F. | 5.2 F. |
| CaBr2 | 15.0 ppg | 0 | 54 F. | >75 F. |
| CaBr2 | 15.0 | 2 | 43 F. | |
| CaBr2 | 15.0 | 12 | 19 F. | |
| CaBr2 | 15.0 | 27 | −2 F. | 28 F. |
| CaBr2 | 15.2 ppg | 32 | −10 F. | 7.5 F. (10K psi) |
| CaBr2 | 15.4 ppg | 0 | 70 F. | |
| CaBr2 | 15.4 | 15 | 44 F. | |
| CaBr2 | 15.4 | 31 | 28 F. | |
| CaCl2 | 11.4 ppg | 0 | 30 F. | |
| CaBr2 | 11.4 | 1.5 | 24 F. | |
| CaBr2 | 11.4 | 3.4 | 10 F. | |

Embodiments of the present disclosure provide wellbore fluids and methods for completing a wellbore with such fluids that include an aqueous base fluid, such as a halide or a formate brine and silica nanoparticles, where the silica nanoparticles to reduce crystallization temperatures of the wellbore fluid. The brines used for the formulation of wellbore fluids as described herein, have good stability and low crystallization temperature. Another aspect of the present disclosure is that the wellbore fluids as described herein have low corrosive effects upon metals such as iron, steel (including carbon steel) and other ferrous metals which typically come into contact with the brines during wellbore operations. In addition, the disclosed wellbore fluids have a low potential for formation damage. For example, the wellbore fluids as described herein do not form an emulsion with crude oils and do not precipitate with formation fluids. Furthermore, the wellbore fluids of the present disclosure may provide reduced environmental risks, as they can replace zinc containing brines for offshore and land drilling and completion activity.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed:

1. A wellbore fluid, comprising:
   a first aqueous base fluid; and
   a plurality of silica nanoparticles suspended in the first aqueous base fluid, wherein the nanoparticles are present in the fluid in an amount to have an effect of decreasing a crystallization temperature by at least 4 to 55° F. as compared to a second aqueous base fluid without the silica nanoparticles; wherein the amount of nanoparticles ranges from 1 wt % to 35 wt % of total weight of the wellbore fluid; wherein the aqueous base fluid is a completion brine with a density in the range of 11 ppg to 18 ppg.

2. The wellbore fluid of claim 1, wherein the nanoparticles are selected from the group of colloidal silica nanoparticles and nano-sized precipitated silica.

3. The wellbore fluid of claim 2, wherein the silica nanoparticles are coated.

4. The wellbore fluid of claim 2, wherein the silica nanoparticles are uncoated.

5. The wellbore fluid of claim 1, wherein the wellbore fluid does not scatter light above 400 nm.

6. The wellbore fluid of claim 1, wherein the nanoparticles have at least one dimension of less than 1 micron.

7. The wellbore fluid of claim 1, wherein the aqueous base fluid is a halide brine or a formate brine.

8. The wellbore fluid of claim 7, wherein the halide brine is selected from the group of alkali metal and/or alkaline earth metal halide brines.

9. The wellbore fluid of claim 1, wherein the wellbore fluid is a drilling fluid and further comprises a gelling agent and a plurality of salt or mineral particulates.

10. The wellbore fluid of claim 1, wherein the wellbore fluid is a fluid loss pill and further comprises a gelling agent and a plurality of salt or mineral particulates.

11. The wellbore fluid of claim 1, wherein the wellbore fluid is a gravel packing carrier fluid further comprising a gelling agent.

12. The wellbore fluid of claim 1, wherein the crystallization temperature is a true crystallization temperature (TCT) or a pressurized crystallization temperature (PCT).

* * * * *